Feb. 12, 1946.  E. E. HARDESTY  2,394,609
CABLE FITTING
Filed Feb. 14, 1944

INVENTOR.
Ethridge E. Hardesty
BY
ATTORNEY

Patented Feb. 12, 1946

2,394,609

UNITED STATES PATENT OFFICE 2,394,609

CABLE FITTING

Ethridge E. Hardesty, Long Beach, Calif.

Application February 14, 1944, Serial No. 522,212

4 Claims. (Cl. 285—46)

This invention relates to a cable fitting and it is a general object of the invention to provide a simple, inexpensive and effective fitting applicable to a junction box, a bulkhead, or to a like structure to pass a cable, a shaft, or like element, and to make a fluid-tight connection between the structure and the element.

There are numerous situations where it is desirable to pass a cable, a rod, or like element into a junction box through a bulkhead or into or through other like structure, and to establish a fluid-tight connection between the element and the structure which receives or passes it. The present invention is concerned with a fitting for use in such a situation and in accordance with the invention the fitting involves a mounting for the fitting and a sealing means to engage around the element being handled. It is a general object of the present invention to provide an extremely simple, effective and easily operated mounting for applying the fitting to a wall such as the wall of a junction box or of a bulkhead. The structure of the present invention involves a single, simple clamp member threaded to the body of the fitting to establish a wedge-like clamp connection between the fitting and the wall to which it is applied. The parts of the connection are simple and plain, making it possible to dependably establish a fluid-tight connection between the fitting and the wall.

Another object of the invention is to provide a combination of fitting body, clamp, gland and packing whereby the clamp which secures the fitting to the wall serves as the abutment for the packing, causing the packing to be fed into sealing engagement with the element carried by the fitting upon the gland being tightened into the body. By the present invention the body of the fitting is of simple form, easily manufactured, and the clamp which secures the body to the wall is a simple part which when in place cooperates with the body to define the packing carrying chamber. The packing carrying chamber thus established or defined by the cooperative relationship of the clamp and body is shaped to guide the packing into sealing engagement with the element handled by the fitting.

Figure 1:
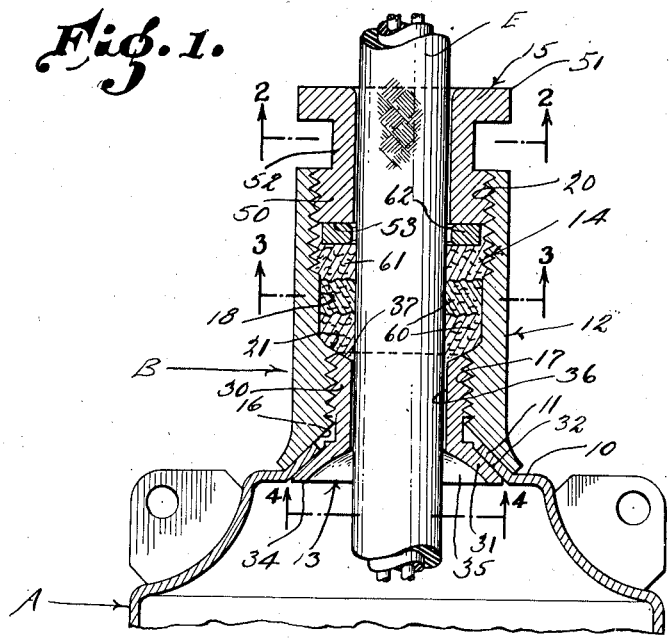
Figure 2:
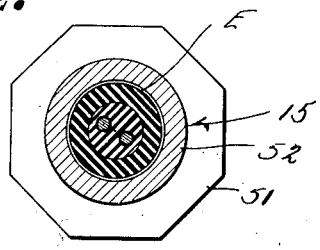
Figure 3:
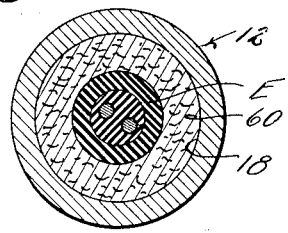
Figure 4:
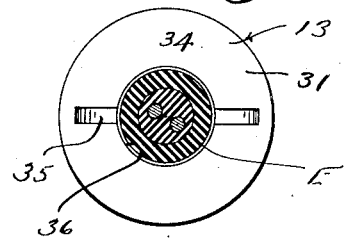

The various objects and features of my invention will be fully understood from the following detailed description of a typical preferred form and application of the invention, throughout which description reference is made to the accompanying drawing, in which:

Fig. 1 is a longitudinal, detailed sectional view of the fitting of the present invention showing it applied to the wall of a junction box and carrying a cable. Fig. 2 is a detailed transverse sectional view taken as indicated by line 2—2 on Fig. 1. Fig. 3 is a detailed transverse sectional view taken as indicated by line 3—3 on Fig. 1, and Fig. 4 is a view taken as indicated by line 4—4 on Fig. 1.

The present invention provides a fitting of the general character hereinabove referred to applicable to structures of various kinds, for instance, to junction boxes, bulkheads, walls of various kinds. Further the device or fitting is such that it can be used to handle or pass elements of various kinds including cables, rods, tubes, etc. In the present disclosure one simple typical application of the invention is set forth and for purpose of example the fitting is shown applied to the wall of a junction box and is shown carrying or passing a cable.

In the drawing a typical junction box is shown at A and the fitting B of the present invention is shown applied to a wall 10 of the junction box. The wall 10 of the junction box is provided with an opening at the point where the fitting is applied. The marginal portion of the wall 10 around the opening is pressed or formed to establish a conical flange 11 for carrying the fitting B. In practice the conical flange may be formed in any suitable manner, for instance it may be rolled, pressed, or spun in accordance with usual manufacturing methods.

The fitting B of the present invention involves, generally, a body 12, a clamp or nipple 13, packing 14 and a gland 15. In general these several parts are related so that the body and clamp cooperate in securing the fitting to the wall 10 and also in establishing or defining the chamber for carrying the packing 14, while the gland 15 is carried by the outer portion of the body where it is accessible for operation.

The body 12 is a tubular member having its inner or base end 16 bevelled inwardly toward the axis of the structure to present a conical face to fit and bear upon the outer face or surface of the conical flange 11 presented by the wall 10. The face 16 is finely sand blasted or similarly finished so as to prevent undue slippage. The body has a threaded opening 17 continuing inwardly from the base or inner end and has a counterbore 18 formed in it from its outer end. The outer end portion 20 of the counterbore is screw-threaded to carry the gland 15. The counterbore 18 is considerably larger in diameter than the threaded opening 17, these two parts being joined by an inner end wall 21 of the counterbore which wall is inwardly pitched or tapered, as will be seen in Fig. 1.

The clamp 13 may be a simple threaded part designed to operate in the threaded opening 17 and to engage the flange 11 of the wall 10. In the simple form illustrated one end portion 30 of the clamp 13 is screw-threaded to fit the opening 17 in the body while the other end portion 31 of the clamp is in the form of a head having a bevelled face 32 designed to fit or seat against the inner side of the conical flange 11. The innermost end or face 34 of the head may be flat, as shown in the drawing, and the clamp 13 may be proportioned so that the face 34 is substantially coincidental with the inner side of the wall 10. To facilitate operation of the clamp 13 diametrically opposite notches or channels 35 are provided in the face 34, as shown in Fig. 4, suitable for the reception of a suitable tool such as can be manipulated to thread the clamp into the body. The surface 16 of the tube body 12 being finely sand-blasted, the tool is only necessary until the joint is made up hand-tight.

The clamp 13 has a central longitudinal opening 36 designed to pass the element handled by the fitting. The opening 36 may be a straight, continuous bore formed through the clamp 13 from one end to the other and proportioned to slidably pass the element E handled by the fitting.

In accordance with the present invention the inner end 37 of the clamp 13 is inwardly bevelled or pitched, as shown in Fig. 1, and the clamp 13 is proportioned so that when the flange 11 is tightly held between the clamp and the body the end 13 of the clamp coincides with the inner end 21 of the counterbore. In practice it is not essential that these surfaces coincide exactly, it being sufficient for practical purposes if they are in substantial alignment. It will be apparent from an examination of Fig. 1 of the drawing that the parts 37 and 21 together form a tapered inner end wall at the inner end of the counterbore 18 so that the packing 14 carried in the counterbore is fed into sealing engagement with the element E.

The gland 15 has a body 50 threaded to fit the threaded part 20 of the counterbore, has an outer end or head 51 to be engaged by an operating tool, and has a neck 52 joining the body and the head. The inner end 53 of the body is designed to engage and operate the packing, and the body is made sufficiently long to have proper threaded engagement in the opening 20. The head 51 may, in practice, be shaped in any suitable manner to receive an operating tool. In the case illustrated the head is polygonal in cross sectional configuration to conveniently receive an ordinary wrench. The neck 53 joins the body 50 and head 51 and is made sufficiently long to allow full operation of the body 50 in the threaded opening 20 without interference of the head 51 with the outer end of the body 12.

The packing employed in the fitting in any particular instance will depend somewhat upon the use to which the device is put or upon the character of the element E being sealed in the fitting. For general use the packing may include one or more rings 60 of soft packing arranged in the inner portion of the counterbore, one or more rings 61 of metallic packing arranged over the soft packing, and a follower 62 arranged over the metallic packing to be engaged by the end 53 of the gland. With the general arrangement of parts and packing as shown in Fig. 1 tightening of the gland 15 and the threaded opening 20 in the body 12 presses or wedges the packing tight between the counterbore and the element E and the tapered faces at the inner end of the packing carrying cavity and particularly the face 37 of the clamp 13 effectively directs or feeds the packing inwardly into sealing engagement around the element E.

From the foregoing description it will be apparent that the present invention provides an extremely simple, inexpensive and effective fitting of the character referred to. The means for mounting the fitting on a wall is extremely simple, effective, and is such that it can be readily operated either to apply the fitting to the wall or to remove it from the wall. The several parts of the device are such that they can be readily manufactured in quantity on ordinary machines, making the structure inexpensive of manufacture.

In practice it is desirable to pitch the threads in the openings 17 and 20 so that turning forces applied to the device to tighten the gland 15 into the body will tend to tighten the body onto the clamp and thus tend to tighten the entire structure.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. A fitting for passing an element and for mounting on a wall having an opening with a flange at the opening including, a tubular body passing the element and having its inner end finished to rest on one side of the flange, a clamp sleeve threaded to the body and engaging the other side of the flange, packing in the body, and a gland carried by the body to press the packing, the clamp and gland having bore openings of substantially equal size and through which the element passes.

2. A fitting for passing an element and for mounting on a wall having an opening including, a tubular body passing the element and having its inner end finished to rest on one side of the wall, a clamp sleeve threaded to the body and engaging the other side of the wall, packing in the body engaged by the inner end of the clamp sleeve, and a gland carried by the body to press the packing, the inner end of the clamp forming an abutment for the packing.

3. A fitting for passing an element and for mounting on a wall having an opening with a projecting flange at the opening including, a tubular body passing the element and having a beveled inner end to engage the flange, an internally threaded portion adjacent the inner end and a counterbore extending into it from its outer end terminating at an outwardly facing shoulder, a clamp sleeve threaded in said portion to engage the flange and so its inner end is substantially coincidental with the shoulder, packing in the counterbore supported by the shoulder and the inner end of the clamp, and a gland carried by the outer portion of the body to actuate the packing.

4. A fitting for passing an element and for mounting on a wall having an opening with a conical projecting flange at the opening including, a tubular body passing the element and having an inwardly beveled inner end to fit the flange, an internally threaded portion adjacent the inner end and a counterbore extending into it from its outer end, a clamp sleeve threaded in said portion and having a beveled head to fit the flange, the sleeve extending to the counterbore, packing in the counterbore and engaging the flange, and a gland carried by the outer portion of the body to actuate the packing, the inner end of the counterbore and the inner end of the clamp together forming an abutment for the packing, the inner end of the clamp being beveled to direct the packing into sealing engagement with an element arranged in the fixture.

ETHRIDGE E. HARDESTY.